United States Patent

[11] 3,580,330

| [72] | Inventor | Pierre Marcel Maugis<br>Suresnes, France |
|---|---|---|
| [21] | Appl. No. | 811,266 |
| [22] | Filed | Jan. 2, 1969 |
| [45] | Patented | May 25, 1971 |
| [73] | Assignee | Societe Technique<br>De Geothermie, Paris, France |
| [32] | Priority | Jan. 3, 1968, Nov. 26, 1968, Nov. 13, 1968 |
| [33] | | France |
| [31] | | 134,778 , 175,285 and 173,426 |

[54] GEOTHERMAL SYSTEM
6 Claims, 5 Drawing Figs.

[52] U.S. Cl. .................................................... 165/45,
 165/135
[51] Int. Cl. ....................................................... F28f 19/00
[50] Field of Search ......................................... 165/45,
 134, 135, 136, 1

[56] References Cited
UNITED STATES PATENTS

| 2,637,531 | 5/1953 | Davidson | 165/45 |
| 2,932,313 | 4/1960 | Noland | 165/45 |

*Primary Examiner* — Charles Sukalo
*Attorney* — Karl F. Ross

ABSTRACT: Hot geothermal water in liquid or vapor form rises, with the aid of a pump if necessary, in an insulated well and passes through a heat exchanger where its heat is utilized for urban heating. Subsequently, the spent water is reinjected through another well into the original geothermal body of water at a point sufficiently remote from the point at which it was extracted to prevent the cooled water from substantially lowering the temperature of the extracted water while ensuring a substantially steady hydrostatic pressure in the body of water.

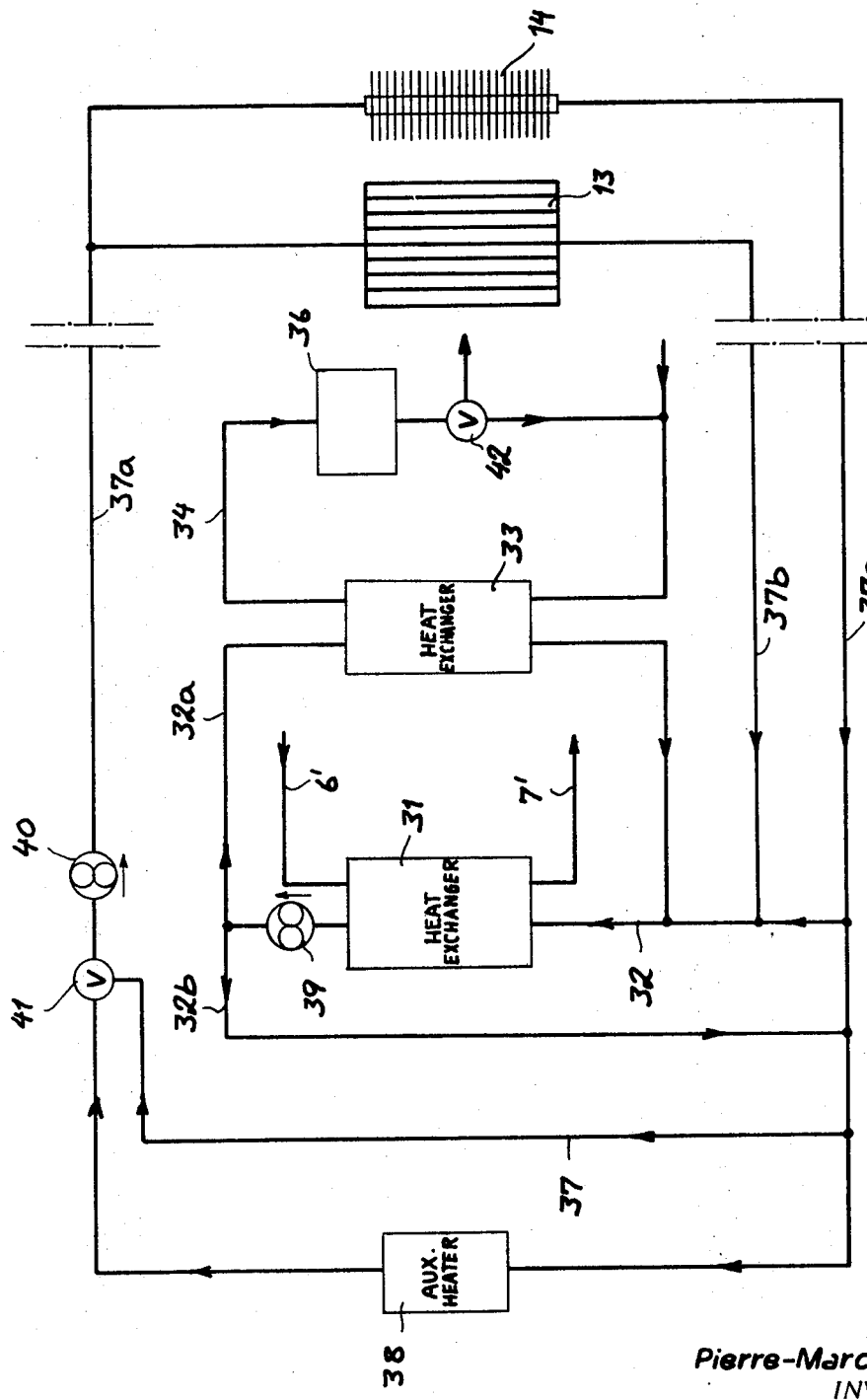

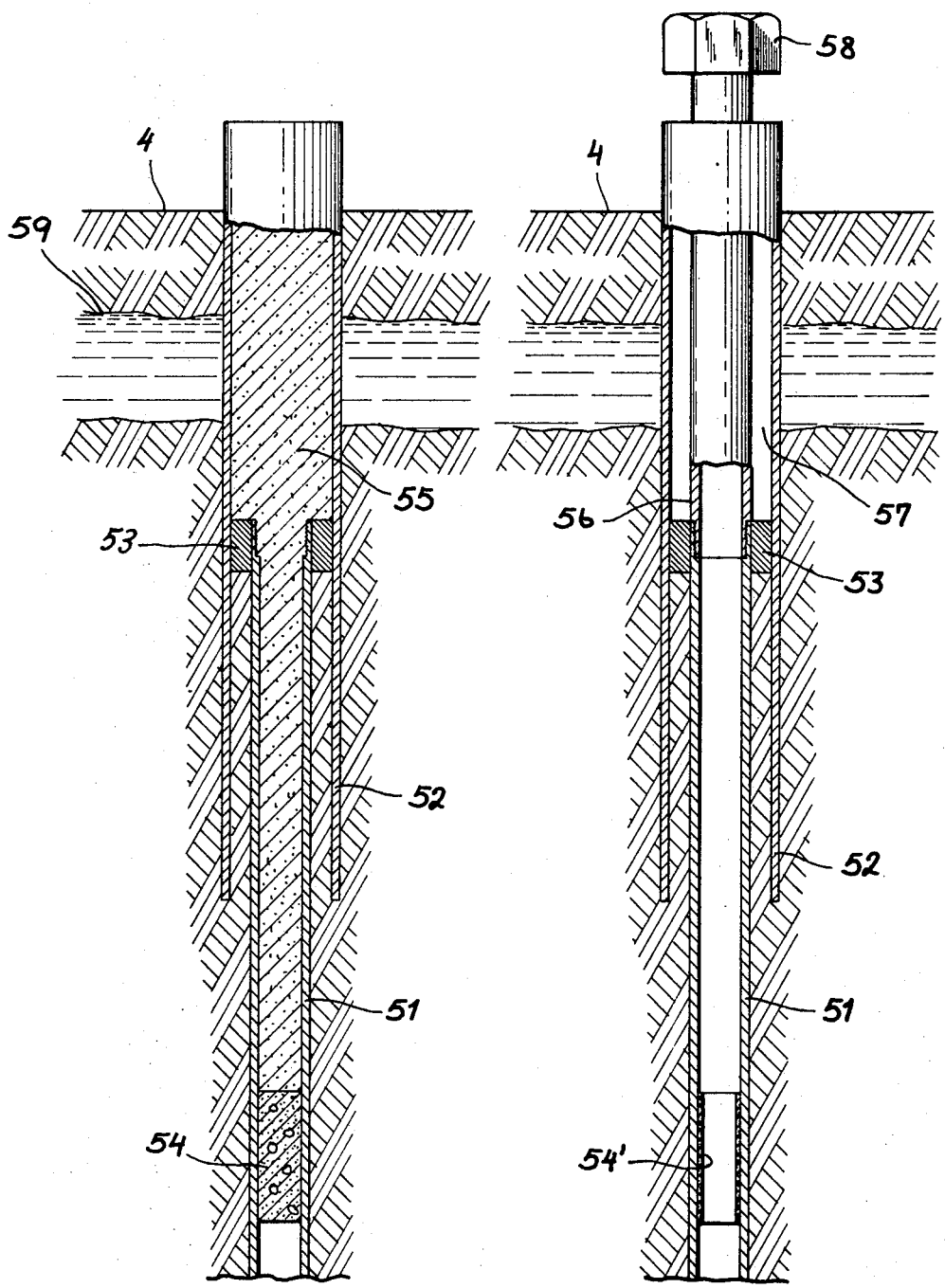

GEOTHERMAL SYSTEM

My present invention relates to a method of and an installation for exploiting geothermal heat, in particular as applied for urban or other large-scale heating operations.

The use of geothermal heat as a source of cheap thermal energy has in recent times become ever more interesting for several reasons, among them a growing concern with pollution of the atmosphere. Thus, heat generation by combustion, fission or fusion gives rise to waste products whose disposal presents very real problems; geothermal energy, on the other hand, is relatively free from this drawback. Moreover, the exploitation of the virtually inexhaustible reservoir of thermal energy in the depths of the earth is economically attractive.

Nonetheless, certain difficulties are inherent in the tapping of this vast heat supply. The obvious methods of bringing hot underground water or steam to the surface, extracting its heat energy and dumping the spent water leads to an early depletion of almost any available source of geothermal heat if an economically interesting delivery rate is to be maintained.

Thus, the general object of my invention is to provide an improved system for exploiting geothermal heat which overcomes the above-mentioned disadvantage.

A more specific object is to provide a method of and means for maintaining a substantially constant temperature and pressure in a subterranean body of water serving as a source of heat for surface installations.

A further object is to provide means in such system for effectively conserving the heat of underground water or steam on its way to the surface.

In accordance with a fundamental feature of my invention, I instantly replenish the extracted underground water by continuously injecting a like amount of colder water into the same subterranean cavity at a location spaced a certain distance —generally several hundred meters or more—from the extraction site. The injected water, advantageously the spent liquid originally extracted, enters the cavity at a point sufficiently remote from the nearest point of extraction to ensure a reheating of this water to substantially the original temperature before recirculation to the surface can occur. Such injection should, on the other hand, take place close enough to the extraction site or sites to maintain a substantially continuous underground flow at a rate preventing a material lowering of the water table during operation of the system. A single injection site may serve several well points driven into the same cavity at different locations to extract the hot water therefrom. Pumps may be used, if necessary, for the removal of the fluid and/or for the introduction of the replenishing liquid.

According to a more particular feature of my invention, a withdrawal pipe used to extract the hot water or steam may be coaxially surrounded by a tubular sheath to create a thermally insulating air space around the path of the rising fluid. This is especially advantageous where the withdrawal pipe must pass through layers of cold water, snow or ice at or near the surface. A pipe so insulated could, of course, also be used for reinjection of the spent effluent from the load.

The invention will be described in greater detail with reference to the accompanying drawing in which:

FIG. 3 is another diagrammatic representation of a heating system embodying the invention;

FIG. 4 is a fragmentary elevational view, in axial section, of a length of tubing sunk into the ground to form part of a channel for the extraction or reinjection of water, shown in an intermediate stage of installation; and FIG. 5 is a view similar to FIG. 4, showing the completed tubing.

Figure 1:
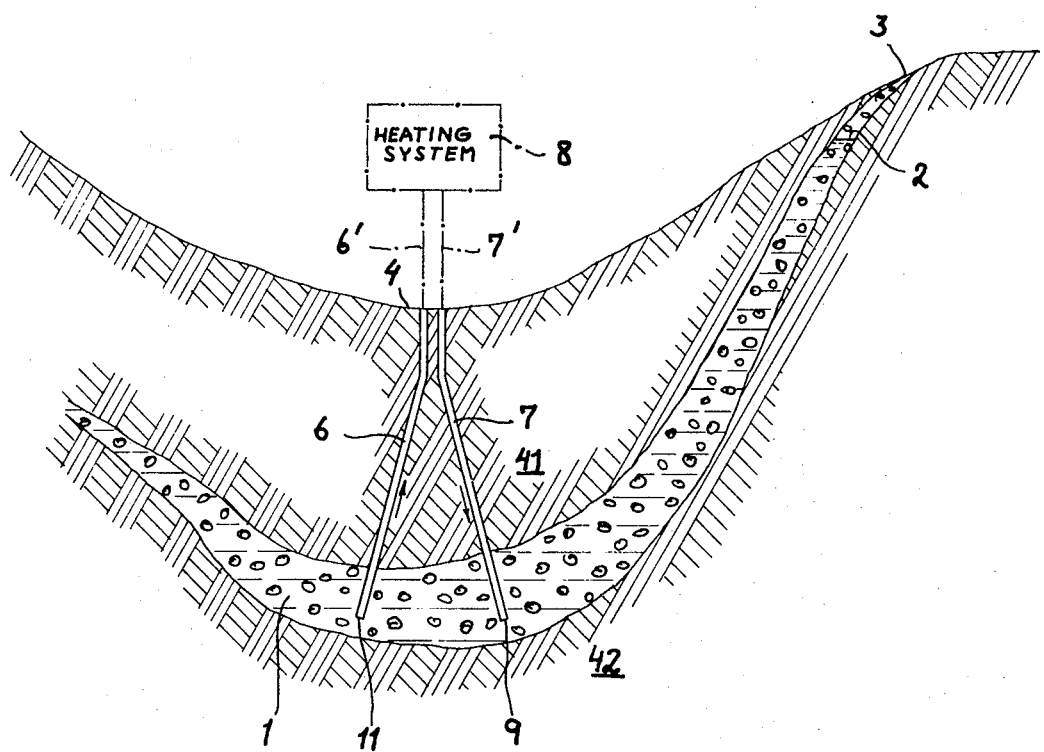
FIG. 1 is a somewhat diagrammatic sectional elevation of a geothermal installation for practicing my invention.

In FIG. 1 I have illustrated a section of terrain including an underground cavity 1 which constitutes a reservoir of geothermally heated water, the cavity having an outlet 3 to the surface in which the water rises to a level 2. It will be understood that the cavity 1 may be filled with loose rock or other permeable subsoil, its boundaries being constituted by impermeable layers 41, 42.

With the liquid level 2 higher than the surface 4 above the center of cavity 1, the hydrostatic pressure inside the fluid bed will be high enough to eject the water through an artesian well 6 driven into the soil, as is well known per se, without the help of a pump. Given a geothermal gradient on the order of 1° C. per 30 m., water trapped about 1,500 m. below sea level may have a temperature between 60° and 70° C.

In accordance with my present invention, I drive into the soil a second channel 7 diverging from its companion channel 6 so as to terminate inside cavity 1 at a location 9 sufficiently remote from the well point 11 at the bottom of channel 6 to prevent an immediate rediffusion of colder water, descending through channel 7, to the well point which would cause a recirculation of the injected water before the latter had had time to warm up to substantially the temperature of the pool. On the other hand, the distance between the two channel terminations 9 and 11 should not be so large that, owing to the finite transit time therebetween, the extraction of hot water through well 6 would deplete the reservoir sufficiently to impair the continued operation of the system. Horizontal spacings on the order of 500 to 1,000 m. between the two channel ends 9 and 11 have been found generally satisfactory. It is also advantageous to inject the replenishing liquid, as shown, at a location between the extraction site 11 and the region of high level 2 whereby any substantial lowering of the water table will be effectively prevented even in the case of a relatively long diffusion time.

On the surface the two channels 6 and 7 are extended by conduits 6', 7' to a heating system 8 representative of any load designed to abstract heat from hot water (or possibly steam) rising in channel 6 and to return the spent cold water, substantially at atmospheric temperature, to the underground pool via channel 7. In a preferred embodiment, system 8 is an installation for urban heating as more fully described hereinafter with reference to FIGS. 2 and 3.

With the lower portions of channels 6 and 7 diverging within the soil, the upper portions may be closely spaced (e.g. several meters apart) to avoid the need for an extensive pipe system above ground.

Figure 2:
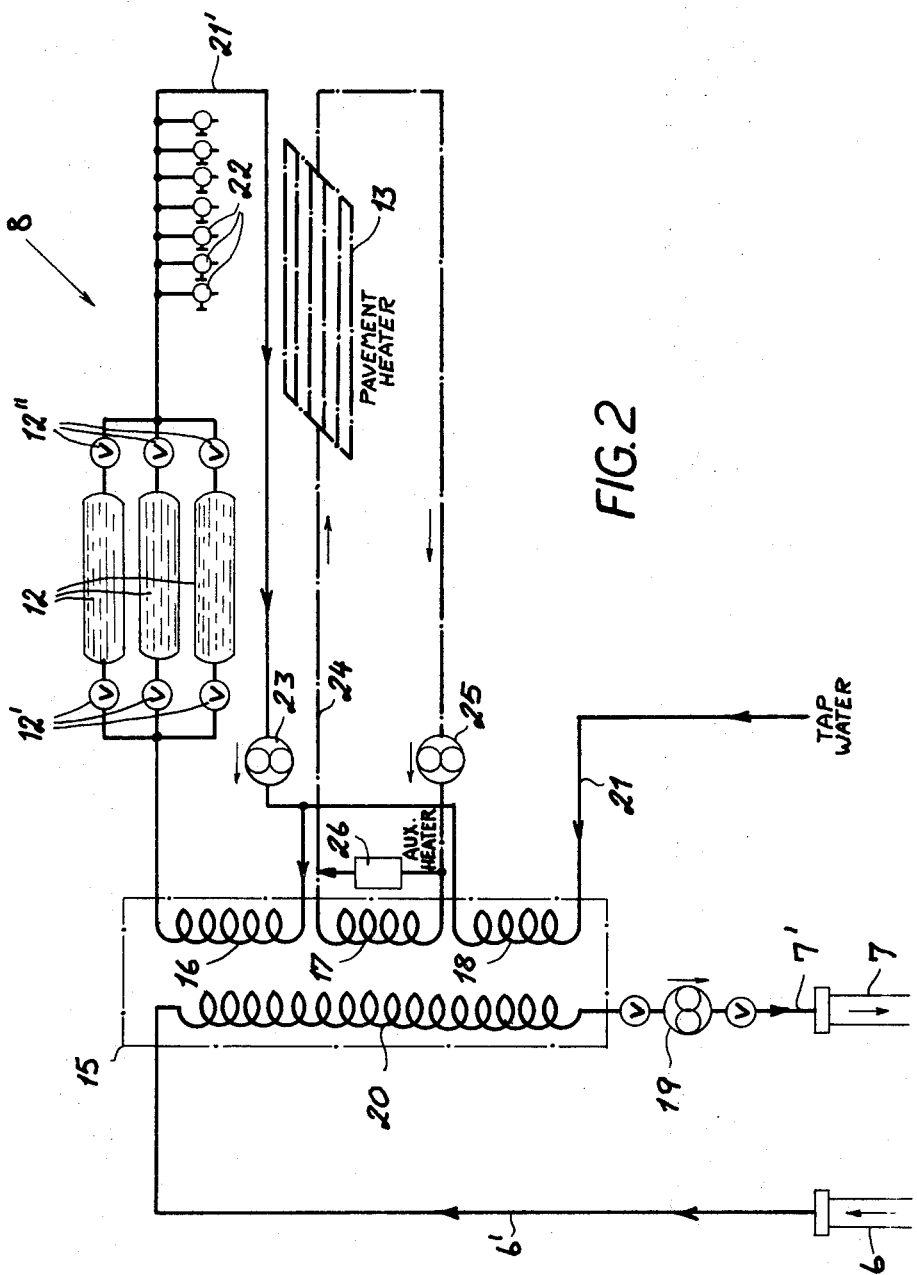
FIG. 2 shows, diagrammatically, the layout of a plant for exploiting thermal energy from the installation of FIG. 1.

With an artesian well as illustrated in FIG. 1, the descending channel 7 or its extension 7' should include a pump, as illustrated at 19 in FIG. 2, to overcome the hydrostatic head within cavity 1. If the fluid pressure within the cavity is insufficient to drive the liquid up the well 6, a similar pump may be inserted in that well or its extension 6'.

Although FIG. 1 shows only a single ascending channel 6 and a single descending channel 7, it will be understood that either or both of these channels may be duplicated at various locations, having regard to the spacing requirements set forth above, to serve several loads.

The heating system 8 illustrated in FIG. 2 comprises three storage tanks 12 connected in parallel, via inlet and outlet valves 12' and 12'', in the flow path of a secondary fluid, such as tap water, supplied thereto via a pipe 21 in heat-exchanging relationship with the geothermal fluid traversing conduits 6' and 7'. A heat exchanger 15 has three sections including respective secondary coils 16, 17 and 18 juxtaposed with a primary coil 20 which is inserted between conduits 6' and 7'. The tap water passes successively through heat-exchanger sections 18 and 16, in counterflow to the geothermal fluid in coil 20, so as to be gradually heated to an elevated temperature at which it is temporarily stored in the thermally insulated tanks 12 pending delivery to a point of use. With the geothermal water in pipe 20 entering the first section at a temperature between, say, 60° and 70° C., dropping to about 45° C. in the second section and to about 25° C. in the third section, the tap water in pipe 16 may reach a level of approximately 65° C. This water can then be utilized for washing or bathing, as indicated diagrammatically by a series of faucets 22 extending from a pipe 21' by which the remainder of this water is returned to the high temperature heat exchanger section 16 with the aid of a pump 23 to mix with the fresh tap water preheated in section 18. The middle section 17 is connected across a conduit 24 which feeds another load 13, e.g. a heater for a pavement or sidewalk, this water being continuously recirculated by a pump 25. In extremely cold weather a conventional (e.g. electric) auxiliary heater 26 may be operated in shunt or in series with coil 17 to supplement the heating effect of heat exchanger 15. On the other hand, an excess of available heat in the primary medium could be utilized for, say, space-heating purposes by direct radiation from conduit system 21, 21'.

A modified heating system has been illustrated diagrammatically in FIG. 3 and includes a heat exchanger 31 through which the geothermal fluid passes as before via conduits 6' and 7'. Tap or utility water from the secondary circuit of the heat exchanger is circulated by a pump 39 through a conduit 32 and is fed via a first branch 32a to a second heat exchanger 33, another branch 32b delivering part of this secondary medium to a pipe system 37 which feeds it to one or more loads such as the pavement heater 13 of FIG. 2 and a radiator 14 in parallel therewith. A pump 40 is inserted in the feeder line 37a of these loads whence a pair of reflux conduits 37b, 37c return the spent water to heat exchanger 31 and to an auxiliary heater 38 of conventional design connectable in parallel with pipe 37 by a valve 41.

A conduit 34 connected to the output side of heat exchanger 33 delivers a tertiary fluid (e.g. tap water) to a buffer reservoir 37 from which it may be recirculated or diverted by a valve 42 to a further load not shown.

As in the preceding embodiment, the effluent from the primary heat exchanger 31 is reinjected by way of drain 7' into the underground cavity 1 of FIG. 1.

In FIGS. 4 and 5 I have shown an insulated tube structure which may be used as part of channel 6 or 7 to prevent undue heat losses, particularly if this channel passes through a low temperature layer (e.g. a pool of cool water 59) on its way to the hot water cavity 1. As illustrated in FIG. 4, this assembly comprises an inner tube 51 coaxially surrounded by a tubular outer sheath 52, the two tubular elements being rigidly interconnected by a fluidtight collar 53. A plug 54, e.g. of concrete, initially seals the interior of tube 51 at a point below its upper end; the space bounded at the bottom by collar 53 and plug 54 is then tightly packed with a filler material 55, such as mud, whereupon the entire unit is sunk into the ground so that collar 53 lies below the surface 4. Next, the mud 5 is pumped out and the plug 54 is drilled through at 54' to provide a continuous passage through pipe 51; an extension pipe 56 is now screwed into the top of pipe 51 so as to be separated by a thermally insulating air space 57 from the outer sheath 52. Pipe 56 may, of course, be additionally provided with a thermally insulating covering. A coupling head 58 permits the connection of this inner pipe 2 to a tube-forming part of the conduit 6' or 7' shown in FIGS. 1—3.

The thermal insulation afforded by air space 57 minimizes heat loss from the conveyed fluid to the soil, particularly in the region of the cold layer 59.

Naturally, the specific installations shown in FIGS. 2 and 3 are given merely by way of example to illustrate the manner in which my present invention may be utilized for urban heating or other large-scale industrial purposes. The principle of heat exchange with a secondary medium has, of course, universal applicability. If the geothermal fluid is steam, both its latent and its sensible heat may be recovered.

The descending and ascending channels 6 and 7 may be formed at least in part by natural passages or could be bored in the soil by conventional well-drilling techniques.

I claim:

1. A system for operating an artesian well having a body of water trapped in an underground cavity under pressure from water rising to a higher level in an extension of said cavity, comprising extraction means forming a first channel from the surface into said cavity at a first location, conduit means above the surface connected to said extraction means for receiving water therefrom, a heat exchanger connected in series with said conduit means for thermally utilizing the water extracted through said first channel and replenishing means connected with said conduit means and forming a second channel for returning the water so utilized to said cavity, said second channel terminating in said cavity at a second location between said first location and said extension to ensure reversion of the returned water to substantially the water temperature of said cavity prior to arrival at said first location; at least one of said channels comprising an inner pipe sunk into the soil and a tubular outer sheath coaxially surrounding, with annular clearance, at least a portion of said inner pipe while defining a thermally insulating air space therewith.

2. A system as defined in claim 1 wherein said channels form downwardly diverging passages in the soil.

3. A system as defined in claim 1 wherein said outer sheath and said inner pipe are interconnected by a fluidtight collar at the lower end of said air space.

4. A system as defined in claim 1 wherein said locations are mutually separated by a distance of substantially 500 to 1000 meters.

5. A system as defined in claim 3 wherein said inner pipe comprises a lower section depending from said collar and an upper section rising above said collar, said lower section being provided with a perforated plug originally serving to retain a removable packing in said lower section and in said outer sheath above said collar prior to introduction of said upper section.

6. A system as defined in claim 5 wherein said outer sheath descends beyond said collar around said lower section and forms therewith a space occupied by soil.